United States Patent [19]

Brooks

[11] Patent Number: 5,715,117
[45] Date of Patent: Feb. 3, 1998

[54] HEAD STACK ASSEMBLY INCORPORATING PLASTIC BINDING STRUCTURE AND METHOD OF MANUFACTURE

[75] Inventor: Peter E. Brooks, Rochester, Minn.

[73] Assignee: Western Digital Corporation, Irvine, Calif.

[21] Appl. No.: 783,392

[22] Filed: Jan. 13, 1997

[51] Int. Cl.⁶ ............................................. G11B 5/48
[52] U.S. Cl. ............................................. 360/104
[58] Field of Search ................................. 360/104

[56] References Cited

U.S. PATENT DOCUMENTS

| | | | |
|---|---|---|---|
| 4,875,117 | 10/1989 | Slezak et al. | 360/98.01 |
| 4,991,045 | 2/1991 | Oberg | 360/104 |
| 5,187,626 | 2/1993 | Hopkins | 360/104 |
| 5,231,549 | 7/1993 | Morehouse et al. | 360/75 |
| 5,283,704 | 2/1994 | Reidenbach | 360/104 |
| 5,355,267 | 10/1994 | Aoyaga et al. | 360/104 |
| 5,495,375 | 2/1996 | Baasch | 360/104 |
| 5,497,282 | 3/1996 | Hoffmann et al. | 360/104 |
| 5,621,590 | 4/1997 | Pace | 360/104 |

*Primary Examiner*—A. J. Heinz
*Attorney, Agent, or Firm*—Leo J. Young; Milad G. Shara

[57] ABSTRACT

A disk drive includes a disk, a magnetic transducer, and a rotary actuator arrangement for positioning the magnetic transducer over a selected area of the disk. The rotary actuator arrangement includes a head stack assembly including a body portion and a plastic arm having an arm surface, a first end and a distal end, with the first end being attached to the body portion. The head stack assembly further includes a load beam for supporting the transducer. The load beam has a plurality of mounting sites, an arm-facing surface, and a retention surface. The head stack assembly further includes a plurality of plastic binding structures that secure the load beam to the arm. Each plastic binding structure has a shaft portion projecting through a respective one of the mounting sites, has a bonding portion forming a homogeneous plastic bond with the arm surface, and has a retention portion abutting the retention surface; whereby the load beam is securely attached to the plastic arm.

9 Claims, 4 Drawing Sheets

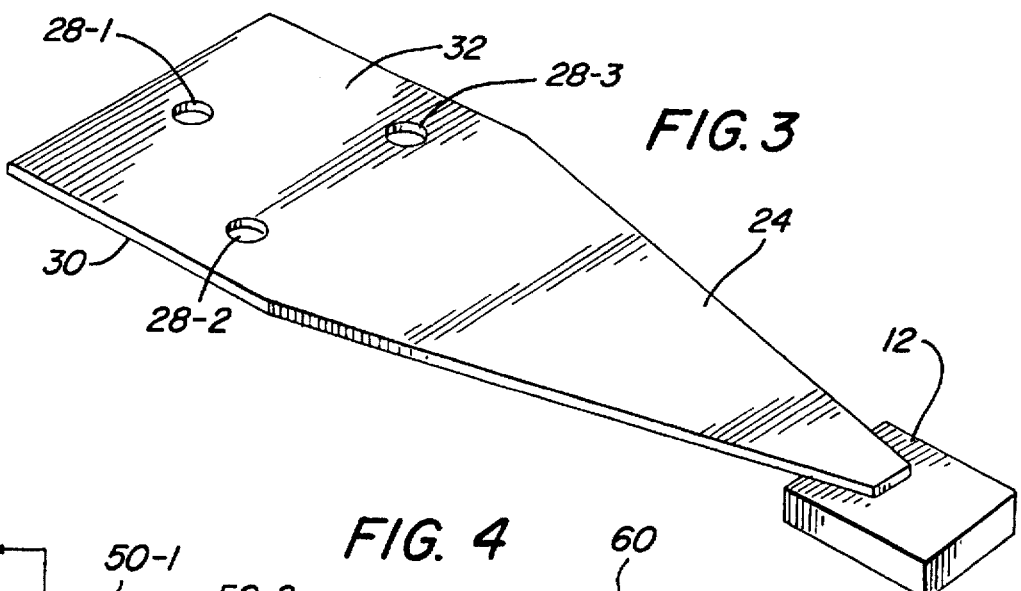
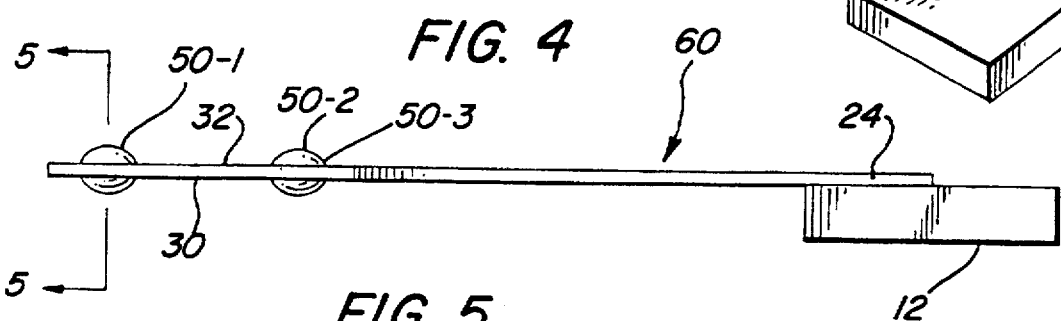
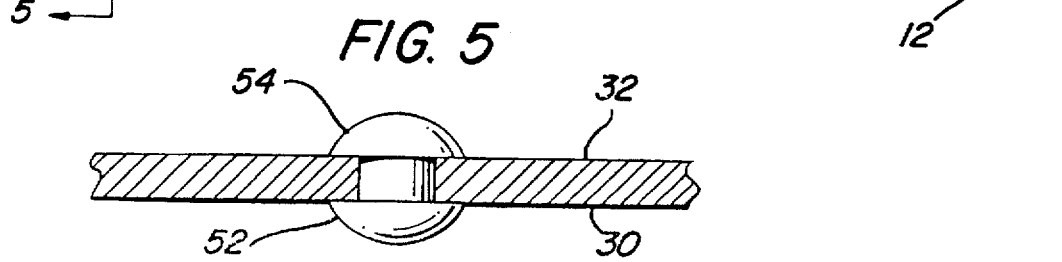
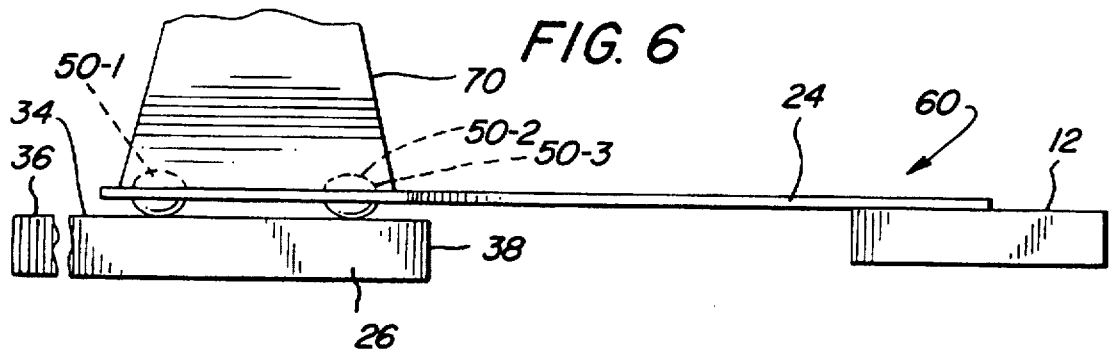

HEAD STACK ASSEMBLY INCORPORATING PLASTIC BINDING STRUCTURE AND METHOD OF MANUFACTURE

BACKGROUND OF THE INVENTION

1. Field of the Invention

This invention relates to hard disk drives. More particularly, this invention relates to a head disk assembly for a hard disk drive and to a method of assembly for the head disk assembly.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main subassemblies of a hard disk drive are a head disk assembly and a printed circuit board assembly The head disk assembly includes an enclosure including a base and a cover; at least one disk having at least one recording surface; a spindle motor for causing each disk to rotate, and an actuator arrangement. The printed circuit board assembly includes circuitry for processing signals and controlling operations of the drive.

The actuator arrangement includes a separate transducer for each recording surface, and includes movable structure for supporting each transducer in any of various positions relative to tracks defined on the recording surfaces. Actuator arrangements can be characterized as either linear actuators or rotary actuators; substantially all contemporary, cost-competitive small form factor drives employ a rotary actuator.

A rotary actuator in a head disk assembly typically includes a permanent magnet arrangement forming part of a voice coil motor, a pivot bearing cartridge having a shaft attached to the enclosure to define an axis of rotation for the rotary actuator, and a swing-type structure including a coil forming another part of the voice coil motor. The swing-type structure includes body having a bore through it, a coil-carrying arm and a plurality of arms. To ensure reduced labor costs in mass-production assembly operations, manufacturers commonly assemble a head disk assembly from prefabricated subassemblies including a head stack assembly. The head stack assembly includes the swing-type structure, and head gimbal assemblies that each include a load beam and a head supported by the load beam. Generally, the cost of the component in, and the subassembly cost of, a head stack assembly is a significant portion of the overall cost to mass produce a drive. Accordingly, substantial research and development efforts have been expended in efforts to provide a low-cost head stack assembly.

SUMMARY OF THE INVENTION

This invention can be regarded as a method of assembling a head stack assembly forming a portion of a rotary actuator arrangement for a magnetic hard disk drive. The head stack assembly has a load beam and a plastic arm for supporting the load beam. The plastic arm has an arm surface, and the load beam has a plurality of mounting sites, an arm-facing surface, and a retention surface. The method comprises molding a plastic nodule into each mounting site. Each plastic nodule, as molded, forms a first dome projecting away from the arm-facing surface and a second dome projecting away from the retention surface. The method further comprises positioning the arm-facing surface to abut the arm surface in a predetermined attitude, and, for each mounting site, placing an ultrasonic welding horn adjacent the plastic nodule. The method further comprises, for each mounting site, applying vibration to the adjacent nodule through the welding horn to produce a plastic binding structure that has a bonding portion, formed from the first dome, defining a homogeneous plastic bond with the arm surface, and a retention portion formed from the second dome, abutting the retention surface. The method provides for securely attaching the load beam to the plastic arm and provides for it to be removed for rework, leaving the plastic arm in a re-usable condition.

This invention can also be regarded as a disk drive having a disk, a magnetic transducer, and a rotary actuator arrangement for positioning the magnetic transducer over a selected area of the disk. The rotary actuator arrangement includes a head stack assembly having distinguishing and advantageous features. The head stack assembly comprises a body portion and a plastic arm having an arm surface, a first end and a distal end, with the first end being attached to the body portion. The head stack assembly further comprises a load beam for supporting the transducer. The load beam has a plurality of mounting sites, an arm-facing surface, and a retention surface. Significantly, the head stack assembly includes a plurality of plastic binding structures that secure the load beam to the arm. Each plastic binding structure has a shaft portion projecting through a respective one of the mounting sites, has a bonding portion forming a homogeneous plastic bond with the arm surface, and has a retention portion abutting the retention surface; whereby the load beam is securely attached to the plastic arm.

BRIEF DESCRIPTION OF THE DRAWINGS

FIG. 3 is a perspective view of a head and load beam assembly for use in this invention, the head and load beam assembly being shown prior to molding of plastic nodules into mounting sites;

FIG. 4 is a side view of a studded load beam assembly produced by molding plastic nodules into mounting sites of the head and load beam assembly FIG. 3;

FIG. 5 is a cross-sectional view taken along line 5—5 of FIG. 4, showing a representative plastic nodule within a mounting site;

FIG. 6 is a side view of a head and load beam assembly being securely attached to a plastic arm in an ultrasonic welding process.

DETAILED DESCRIPTION OF A PREFERRED EMBODIMENT

Figure 1:
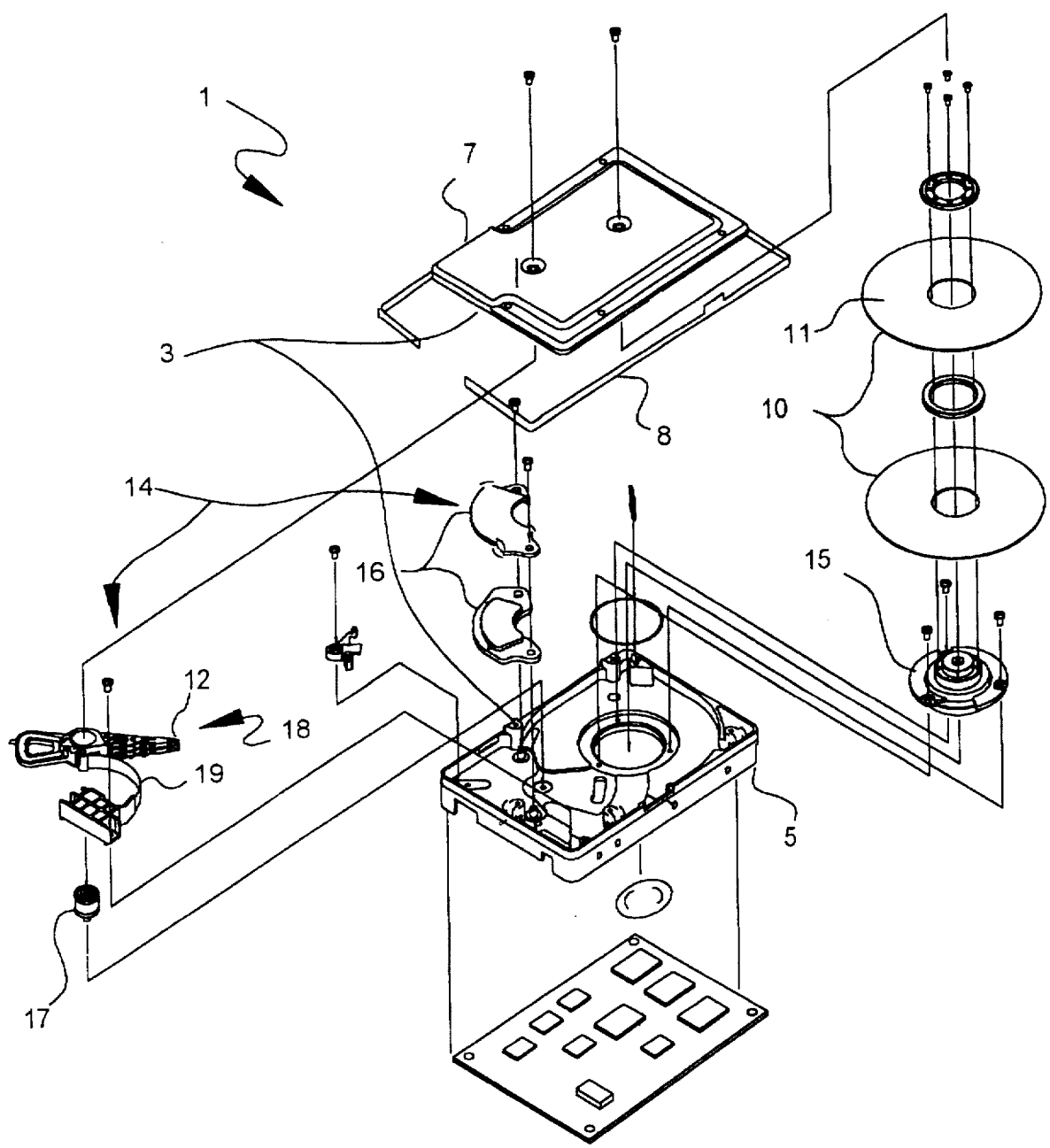
FIG. 1 is an exploded view of a hard disk drive including an embodiment of this invention.

As shown in FIG. 1, a disk drive 1 embodying this invention comprises an enclosure 3 comprising a base 5 and a cover 7. Enclosure 3 is sealed to provide a relatively contaminant-free interior for a head disk assembly portion of disk drive 1. Suitably, a tape seal 8 is used to seal enclosure 3.

Within its interior, disk drive 1 includes a magnetic disk 10 having a recording surface 11, and includes a magnetic transducer 12. The particular embodiment shown in FIG. 1 includes two disks 10, providing four recording surfaces, and includes four magnetic transducers 12. Disk drive 1 further includes a rotary actuator arrangement generally indicated at 14. A spindle motor 15 causes each disk 10 to spin, preferably at a constant angular velocity.

Rotary actuator arrangement 14 provides for positioning magnetic transducer 12 over a selected area of recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft secured to enclosure 3 to define an axis of rotation for rotary actuator arrangement 14. Head stack assembly 18 includes a flex circuit assembly 19 and a subassembly 18s shown in more detail in FIG. 2.

Figure 2:
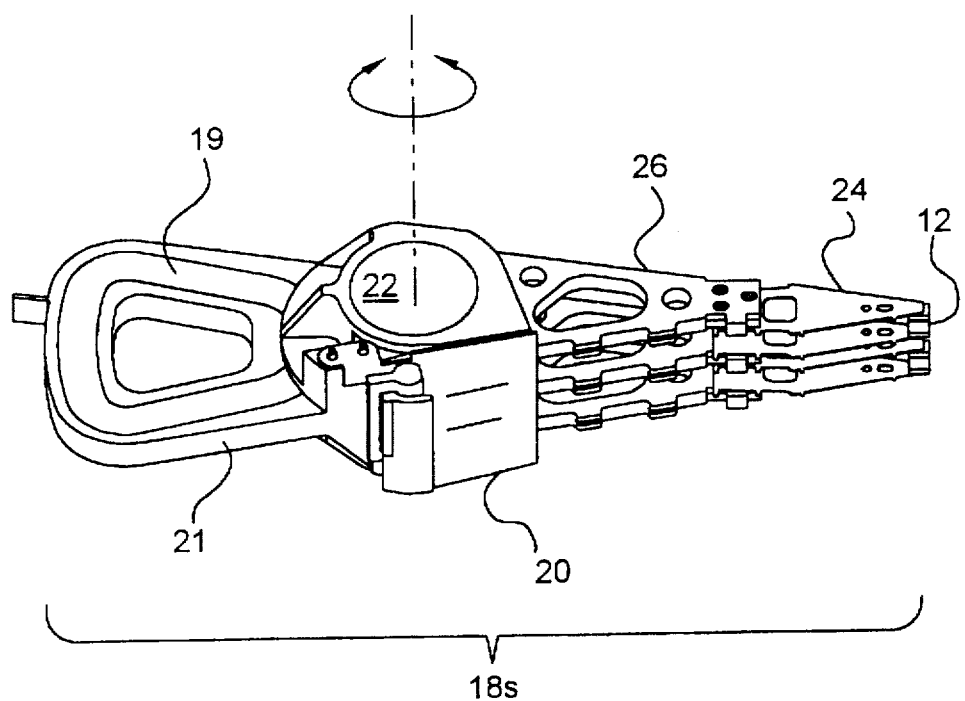
FIG. 2 is a perspective view of a subassembly of the head stack assembly included in the disk drive of FIG. 1.

As shown in FIG. 2, subassembly 18s of head stack assembly 18 comprises a coil 19 and a body portion 20. Preferably, body portion 20 is plastic and includes an overmolded portion 21 that supports coil 19. Body portion 20 has a bore 22 to receive pivot bearing cartridge 17. In operation of disk drive 1, circuitry not shown causes current to conduct through coil 19, and because coil 19 lies in the magnetic field provided by permanent magnet arrangement 16, a torque is applied to head stack assembly 18. The amount and direction of that torque is subject to control of a servo system that controls the rotary positioning of transducer 12.

Head stack assembly 18 further comprises a load beam 24 and a plastic arm 26. Each load beam 24 supports a respective transducer 12. The particular embodiment shown in FIG. 2 includes four load beams 24 and three plastic arms 26. Some but not all features of a load beam bear detailed description herein. Accordingly, certain conventional features relating to such matters as the gimbal for attaching the head, flanges for controlling stiffness, etc., are not discussed in detail herein and are not shown in detail in FIGS. 3 through 7 which are simplified to clarify the basic structure involved.

Distinguishing and advantageous features reside in the method by which head stack assembly 18 is assembled. Prior to final assembly of head stack assembly 18, a head gimbal assembly as shown in FIG. 3 is provided which includes head 12 and load beam 24. Preferably, load beam 24 is a metal stamping that has a plurality of mounting sites 28 (28-1, 28-2, and 28-3) at one end and is attached to head 12 at its opposite end. Load beam 24 has an arm-facing surface 30, and a retention surface 32. Preferably, mounting sites 28-1, 28-2, and 28-3 are arranged at the vertices of a triangle.

As shown in FIG. 6, plastic arm 26 has an arm surface 34, a first end 36 attached to body portion 20, and a distal end 38 for attaching load beam 24. After final assembly, head stack assembly 18 includes a plurality of plastic binding structures 40 including structures 40-1 and 40-2 shown in FIG. 7. In the preferred embodiment, three such plastic binding structures make a three-point connection between load beam 24 and plastic arm 26. Each plastic binding structure 40 includes a shaft portion 42 projecting through a respective one of mounting sites 28, a bonding portion 44 defining a homogeneous plastic bond with arm surface 34, and a retention portion 46 abutting retention surface 32.

In the course of assembling head stack assembly 18, a step is performed by which load beam 24 of FIG. 3 is subjected to a molding process to mold a plurality of plastic nodules 50 (50-1, 59-2, and 50-3) into mounting sites 28 (28-1, 28-2, and 28-3) to produce the structure shown in FIG. 4, this structure being referred to herein as studded load beam 60. As shown in FIG. 5, each plastic nodule 50, as molded, forms a first dome 52 projecting from arm-facing surface 30, and forms a second dome 54 projecting from retention surface 32.

Figure 7:
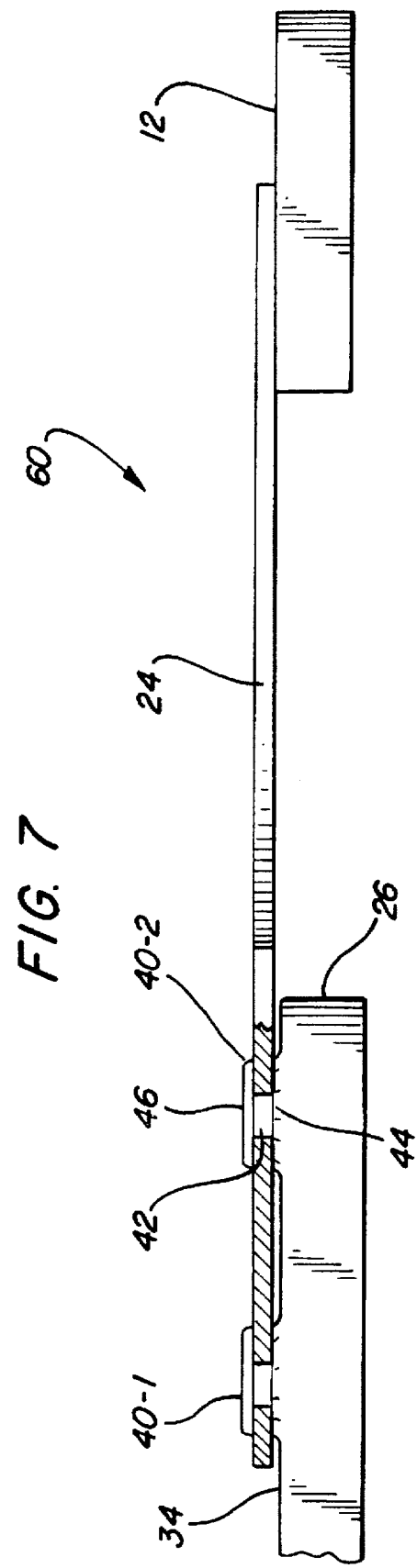
FIG. 7 is a side view of the resulting assembly including plastic arm and head and load beam assembly after the ultrasonic welding process.

As shown in FIG. 6, further steps in this process entail positioning arm-facing surface 30 of studded load beam 60 to abut arm surface 34 of plastic arm 26, and then, for each mounting site 28-1, 28-2, and 28-3, placing an ultrasonic welding horn 70 adjacent plastic nodule 50-1, 50-2, and 50-3, and applying vibration to the adjacent plastic nodule through ultrasonic welding horn 70 to produce a respective one of plastic binding structures such a 40-1 and 40-2 shown in FIG. 7. Suitably, location features (not shown) are provided and used during the ultrasonic welding process to ensure the longitudinal axis of load beam 24 aligns with the longitudinal axis of arm 26.

Occasionally, a need arises for rework on a head stack assembly. Sometimes, one of the heads proves to be defective. Sometimes, electrical connections such as wires or conductive traces to a head prove to be open. Various other defects can result in a need to replace a head stack assembly in the course of mass production of disk drives. In such cases, it is uneconomical to scrap an entire head stack assembly, which often constitutes a significant part of the overall material cost of a disk drive. A head stack assembly in accord with the preferred embodiment of this invention makes rework relatively easy; i.e., it is relatively easy to remove a single head gimbal assembly from the head stack assembly then reuse the remaining part of the head stack assembly as a pan of another head stack assembly unit. Removal of the head gimbal assembly can be accomplished by using a knife edge or the like to sever bonding portions 44.

An advantage of using plastic as the material for plastic arm 26 relates to the need to minimize the moment of inertia of the head stack assembly. High speed seek operations, without consumption of excess electrical power, are facilitated by using light weight plastic for the arms. As for the load beam itself, it is preferably made of a light-weight, very thin metal stamping having desired torsional resistance characteristics, and appropriate hinging and spring characteristics. During the ultrasonic welding process, the plastic material of plastic nodules 50 softens and the plastic material of surface 34 of arm 26 also softens, and the softened materials blend or meld together. Thus, the plastic materials are suitably selected to have similar characteristics and preferably are the same type of plastic. In an embodiment in which it is desired to electrically ground each plastic arm 26, an appropriate plastic material for each arm is a glass and carbon reinforced thermoplastic.

I claim:

1. A method of assembling a head stack assembly forming a portion of a rotary actuator arrangement for a magnetic hard disk drive, the head stack assembly having a load beam and a plastic arm for supporting the load beam, the plastic arm having an arm surface, the load beam having a plurality of mounting sites, an arm-facing surface, and a retention surface, the method comprising:
   a) for each mounting site, molding a plastic nodule into the mounting site, each plastic nodule, as molded, forming a first dome projecting from the arm-facing surface and a second dome projecting from the retention surface;
   b) positioning the arm-facing surface to abut the arm surface in a predetermined attitude;
   c) for each mounting site, placing an ultrasonic welding horn adjacent the plastic nodule;
   d) for each mounting site, applying vibration to the adjacent plastic nodule through the welding horn to produce a plastic binding structure that has a bonding portion, formed from the first dome, defining a homogeneous plastic bond with the arm surface, and that has a retention portion, formed from the second dome, abutting the retention surface;
whereby the load beam is securely attached to the plastic arm and can be removed for rework leaving the plastic arm in a re-usable condition.

2. The method of claim 1, wherein the load beam is a metal stamping.

3. The method of claim 1, wherein the load beam has three mounting sites.

4. The method of claim 1, wherein the plastic arm is a glass and carbon reinforced thermoplastic.

5. A disk drive having a disk, a magnetic transducer, and a rotary actuator arrangement for positioning the magnetic transducer over a selected area of the disk, the rotary actuator arrangement including a head stack assembly comprising:
   a body portion;
   a load beam for supporting the transducer, the load beam having a plurality of mounting sites, an arm-faring surface, and a retention surface;
   a plastic arm having an arm surface, a first end attached to the body portion, and a distal end for attaching the load beam; and
   a plurality of plastic binding structures securing the load beam to the arm;
   each plastic binding structure having a shaft portion projecting through a respective one of the mounting sites, having a bonding portion defining a homogeneous plastic bond with the arm surface, and having a retention portion abutting the retention surface;
whereby the load beam is securely attached to the plastic arm.

6. The disk drive of claim 5, wherein the load beam is a metal stamping.

7. The disk drive of claim 5, wherein the load beam has three mounting sites.

8. The disk drive of claim 5, wherein the plastic arm is a glass and carbon reinforced thermoplastic.

9. The disk drive of claim 5, and further comprising a pivot bearing cartridge having a sleeve, and wherein the body portion has a bore surrounding the sleeve.

* * * * *